Aug. 15, 1939.   C. W. CHAPMAN   2,169,381
INTERNAL COMBUSTION ENGINE OF THE COMPRESSION IGNITION TYPE
Filed Nov. 17, 1937
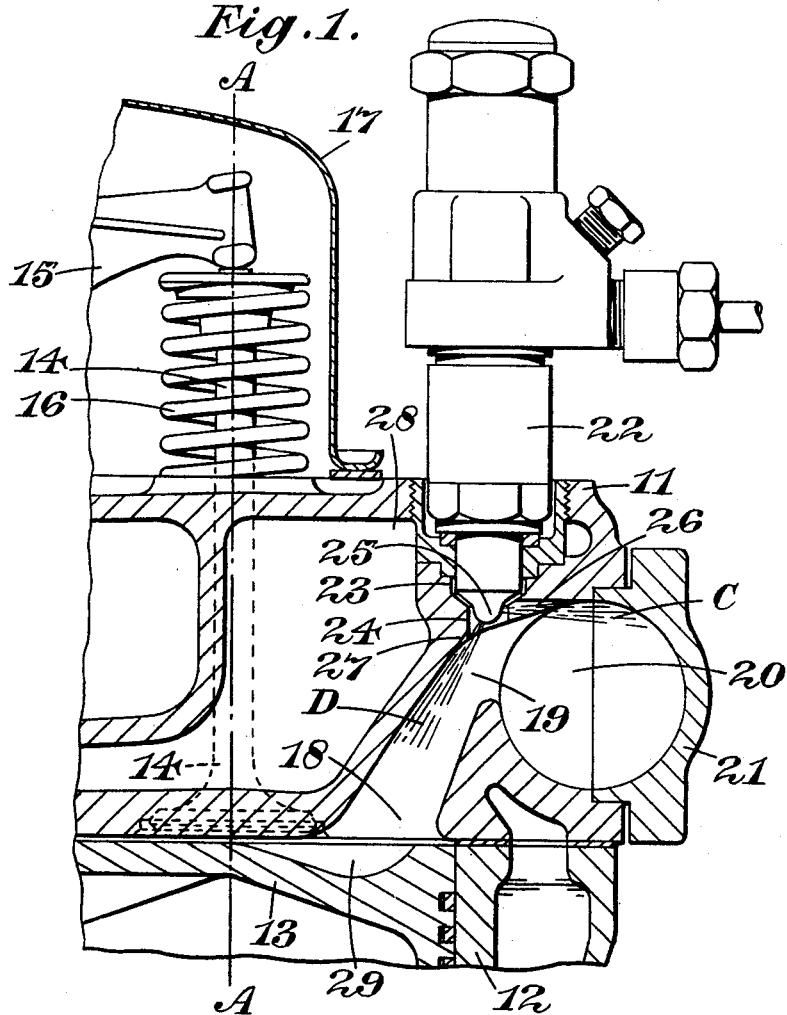
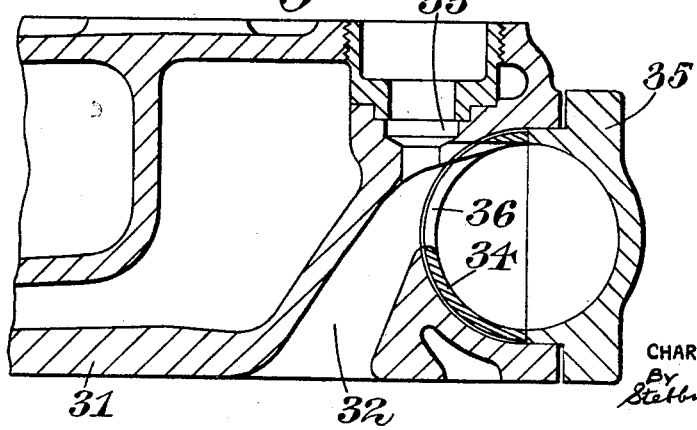
INVENTOR
CHARLES WALLACE CHAPMAN
ATTORNEYS Patented Aug. 15, 1939

2,169,381

UNITED STATES PATENT OFFICE 2,169,381

INTERNAL COMBUSTION ENGINE OF THE COMPRESSION IGNITION TYPE

Charles Wallace Chapman, Peterborough, England, assignor to F. Perkins Limited, Peterborough, Northamptonshire, England, a British company Application November 17, 1937, Serial No. 174,959
In Great Britain December 17, 1936

4 Claims. (Cl. 123—32)

This invention comprises improvements in or relating to internal-combustion engines of the compression ignition type.

It has been proposed in prior United States Patent No. 2,021,744 to provide an internal-combustion engine of the compression ignition type with a small combustion chamber communicating with the compression space in the cylinder through a transfer passage, and to inject fuel into the transfer passage in such a way that some of the fuel is projected along the passage into the combustion chamber and some of the fuel is projected along the passage towards the compression space of the cylinder.

The present invention contemplates a modification of the disposition of the parts described in the aforesaid prior patent specification with a view to obtaining greater efficiency.

The present invention comprises in an internal-combustion engine of the compression ignition type the provision in the cylinder head of a transfer passage extending out of the upper portion of the cylinder space from a point to one side of the cylinder axis, which transfer passage is inclined away from the cylinder axis and bent outwardly in the course of its length toward the side of the cylinder head and a combustion chamber (having the shape of a figure of revolution or an approximation thereto) located in the side of the cylinder head so that the transfer passage enters it tangentially. In this way the combustion chamber is made accessible and carried out of the way of the valves and the other parts in the cylinder head, while the shape of the water space which has to be disposed between and around the valve passages and the transfer passage, is simplified.

Preferably the transfer passage is tapered to a smaller section near the end where it enters the combustion chamber. In this way the gases are caused to enter the combustion chamber at an increased velocity due to the Venturi shaping of the transfer passage.

Conveniently the combustion chamber is recessed into the side of the cylinder head and provided with a removable cover secured on the side of the head. The portion of the combustion chamber which is formed by a recess in the side of the cylinder head may, if desired, be provided with a separate insert the interior of which forms a continuation of the contour of the wall of the removable cover. Such an insert may be formed from a hollow pressing, and being insulated from the cylinder head itself by a small air gap it assists in keeping the gases which are to be burned from being unduly cooled by the walls of the head.

Preferably the injection nozzle is located above the transfer passage and the nozzle enters the said passage in the upper wall where it is bent to enter the combustion chamber. The wall of the transfer passage may be recessed where the fuel nozzle enters it to permit the tip of the nozzle to be flush, or almost flush, with the general contour of the transfer passage and yet to inject fuel tangentially into the combustion chamber and downwardly into the engine cylinder in a direction parallel to the line of flow of air along the transfer passage.

The fuel injection nozzle may be located in a bore, which instead of being drilled through into the transfer passage with its full diameter throughout is reduced at its point of entrance into the transfer passage so that only the tip of the fuel nozzle is exposed to the gases in the passage.

According to a further feature of the present invention in an internal-combustion engine of the type above described which is provided with a transfer passage in communication with the compression space and a combustion chamber and means to direct fuel along the transfer passage towards the end cylinder, a recess is provided in the head of the piston in line with the transfer passage.

Preferably the recess is deepest below the end of the transfer passage and tapers off gradually to the level of the flat top of the piston at or about the centre line of the piston.

The following is a description by way of example of two specific forms of cylinder head in accordance with the invention.

In the drawing:

Figure 1 is a vertical section through a portion of one form of cylinder head showing it in position above an engine cylinder.

Figure 2 is a similar section through another form of cylinder head.

Referring to Figure 1 the cylinder head 11 is shown above a cylinder 12 within which works a piston 13. The cylinder head contains the usual inlet and outlet valves and their appropriate communication passages. One of the valves is indicated at 14 and is operated by a valve rocker 15 against a closing spring 16. The valve mechanism is enclosed in a cover 17.

The centre line of the cylinder is indicated by a chain line A—A. In the cylinder head and starting from a point to one side of the centre line A—A there is an inclined transfer passage 18 which is inclined outwardly away from the axis of the cylinder and is bent at 19 outwardly towards the side of the cylinder head 11. It enters tangentially a spherical combustion chamber 20 which is recessed into the side of the cylinder head 11 and one half of which, in the construction illustrated in Figure 1 is formed in the cylinder head itself. The other half of the combustion chamber is constituted by a removable cover 21 which is secured in place by bolts or clamps, not shown in the drawing.

Above the bent portion 19 of the transfer passage 18 there is disposed a fuel injection nozzle 22 which is located in a vertical bore 23 in the cylinder head the diameter of which is reduced at 24 where it enters the transfer passage so that only the tip 25 of the injection nozzle is exposed to the hot gases in the passage. The transfer passage is recessed or grooved as shown at 26, 27 immediately opposite the tip 25 of the injection nozzle so as to permit fuel from the nozzle to be directed tangentially into the chamber 20, where indicated at C and also in a jet such as D which extends down the transfer passage towards the cylinder in a direction parallel to the wall of the passage.

It will be observed that the injection nozzle is substantially flush with the outer wall of the transfer passage and therefore does not interfere with the flow of air along the passage. It will further be observed that the transfer passage is tapered so that its smallest section occurs about the bent portion 19, the gases therefore entering the combustion chamber 20 at a higher velocity than that at which they leave the cylinder 12.

It will further be observed that the transfer passage 18 is surrounded by a water space 28 in the cylinder head and that owing to the direction of the transfer passage carrying it away from the valve 14 the water space is of ample proportions and of simple form. Moreover, the injection nozzle 22 can, owing to the disposition of the transfer passage, be located well away from the valve mechanism where it is conveniently accessible and the removable combustion chamber cover 21 is also very accessible and permits of ready inspection of the inside of the chamber and the tip of the nozzle.

The piston 13 is provided with a recess 29 in line with the transfer passage 18 so that the hot gases emerging from the combustion chamber 20 through the passage 18 when ignition commences enter the depression and are deflected towards the centre of the cylinder. Presumably an appreciable weight of air is retained in the depression 29 at the end of the compression stroke of the engine and the spray of fuel coming down the transfer passage 18 can efficiently combine with this air resulting in more complete combustion of that part of the fuel which is projected down the transfer passage. However this may be, it has been found that in certain cases an engine provided with a depression in the head of the piston opposite the transfer passage, as illustrated in the drawing, shows a marked improvement in maximum power. It will be observed that the depression 29 tapers off gradually towards the centre of the piston 13. It will be appreciated that this results in a recess which is approximately pear-shaped as viewed in plan.

Referring to Figure 2, this illustrates a cylinder head 31 having an inclined transfer passage 32. The cylinder head is in most respects similar to that illustrated in Figure 1 and it comprises a bore 33 to receive a fuel injection nozzle similar to the nozzle 22, Figure 1. The transfer passage is inclined, tapered and bent outwardly as already described in connection with Figure 1. The difference is that the combustion chamber is provided with a loose insert 34, pressed from sheet steel and of such an internal diameter as to form a continuation of the shape of the outer removable cover 35. The insert is provided with an aperture 36 which is in alignment with the transfer passage 32. Owing to the use of the insert (which is heat-insulated from the cylinder head through the dis-continuity between the metal of the insert and the walls of the cylinder head) the combustion gases tend to keep somewhat hotter and in small or cool running engines the employment of such an insert may be found to be desirable.

Either of the cylinder heads described can be used in conjunction with plain pistons or pistons having a recess such as the pistons 13 of Figure 1.

I claim:

1. In a compression-ignition engine the combination of a working cylinder, a cylinder head, a combustion chamber approximating to a figure of revolution located in the side of the cylinder head, a transfer passage in the cylinder head affording communication between the combustion chamber and the working cylinder and extending from the end of the working cylinder towards the combustion chamber from a point to one side of the cylinder axis, said transfer passage being inclined away from the cylinder axis and bent outwardly in the course of its length intermediate its ends so that it enters the combustion chamber tangentially, a fuel nozzle projecting through the cylinder head and terminating at the outer side of the bend substantially flush with the wall of the transfer passage at the point of entrance, a recess in the wall of the transfer passage at the entry of the fuel nozzle thereinto such as to permit the tip of the fuel nozzle to be substantially flush with the general contour of the transfer passage and yet to inject part of the fuel along the transfer passage towards the engine cylinder and simultaneously to inject part of the fuel along the transfer passage tangentially into the combustion chamber and away from the cylinder, and a piston and operative connections to expel air from the cylinder into the combustion chamber and transfer passage past the fuel injector on the compression stroke of the engine.

2. In a compression-ignition engine as claimed in claim 1 the arrangement of the fuel injection nozzle in a bore the diameter of which is reduced at its point of entrance in the transfer passage so that only the tip of the fuel nozzle is exposed to gasses in the passage.

3. In a compression-ignition engine the combination of a working cylinder, a cylinder head, a combustion chamber approximating to a figure of revolution located in the side of the cylinder head, a transfer passage in the cylinder head affording communication between the combustion chamber and the working cylinder and extending from the end of the working cylinder towards the combustion chamber from a point to one side of the cylinder axis, said transfer passage being inclined away from the cylinder axis and bent outwardly in the course of its length intermediate the ends thereof so that it enters the combustion chamber tangentially, the transfer passage also being reduced in cross-sectional area towards the bend, a recess in the outside wall of the transfer passage at the bend, the cylinder head having a bore therein leading from the outside of the head to the transfer passage at the bend thereof, a fuel nozzle in said bore, the tip of the nozzle projecting into said recess so that the fuel nozzle is substantially flush with the general contour of the transfer passage and is in position to inject part of the fuel along the transfer passage towards the engine cylinder and substantially parallel to the passage wall and simultaneously to inject part of the fuel along the transfer passage tangentially into the combustion chamber and a piston and operative connections to expel air from the cylinder into the combustion chamber and transfer passage past the fuel injector on the compression stroke of the engine.

4. In a compression-ignition engine the combination of a working cylinder, a cylinder head, a combustion chamber approximating to a figure of revolution located in the side of the cylinder head, a transfer passage in the cylinder head affording communication between the combustion chamber and the working cylinder and extending from the end of the working cylinder towards the combustion chamber from a point to one side of the cylinder axis, said transfer passage being inclined away from the cylinder axis and bent outwardly in the course of its length intermediate the ends thereof so that it enters the combustion chamber tangentially, a recess in the outside wall of the transfer passage at the bend, a fuel nozzle entering the transfer passage at the outside of the bend therein the tip of the nozzle terminating substantially flush with the wall surface of the passage at the point of entrance, the tip of the nozzle having orifices therein so disposed as to inject part of the fuel along the transfer passage towards the engine cylinder and simultaneously to inject part of the fuel along the transfer passage substantially tangentially into the combustion chamber, and a piston and operative connections to expel air from the cylinder into the combustion chamber and transfer passage past the fuel injector on the compression stroke of the engine.

CHARLES WALLACE CHAPMAN.